United States Patent Office 3,418,401
Patented Dec. 24, 1968

3,418,401
METHOD OF SLIP CASTING BASIC REFRACTORY MATERIALS
George R. Henry, Bethel Park, and Eldon D. Miller, Jr., Bridgeville, Pa., assignors to Dresser Industries, Inc., Dallas, Tex., a corporation of Delaware
No Drawing. Filed May 2, 1966, Ser. No. 546,498
5 Claims. (Cl. 264—56)

ABSTRACT OF THE DISCLOSURE

A method of slip casting basic refractory shapes from basic refractory materials comprising, adding from 0.2 to 5%, by weight, finely divided flowers of sulfur and about 0.1 to 1% ethylene-diamine to the size-graded batch.

---

This invention relates to the manufacture of ceramically bonded, chemically basic refractories. In a particular aspect, it relates to the casting of refractory shapes from basic refractory material. This invention is directly related to and an improvement over U.S. Patent No. 3,189,668, assigned to the same assignee.

The use of casting techniques and, particularly, slip casting, for making thick-walled refractory shapes from certain chemically basic refractory materials has been fraught with difficulty. In order to slip cast a chemically basic refractory material such as dead burned magnesite (more aptly termed dead burned magnesia in that its main constituent is MgO), to obtain a self-sustaining refractory shape, preferably having high density and low porosty it is necessary to size grade the material so a considerable portion thereof is in the fine fraction of the batch. However, fine dead burned magnesia (—65 or —325 mesh) is extremely susceptible to hydration.

Another basic raw material that is being used in increasing amounts is fused magnesite-chrome ore grain. The same problems often are encountered when attempting to cast this grain. This susceptibility to hydration upon exposure to the atmosphere tends to cause cracking, bloating, and swelling of cast shapes particularly when an aqueous tempering media (the preferred tempering media for slip casting) is employed. This tendency to hydrate is particularly distressing with high-purity dead burned synthetic magnesia which is available today. When we say "high purity" in this case, we mean a dead burned magnesia containing about 90% or more MgO, by weight, on the basis of an oxide analysis.

United States Patent No. 3,189,668, referred to above, discloses that flowers of sulfur additions can prevent cracking, bloating and swelling during drying of basic materials when cast in an aqueous media. However, it is necessary to cast almost immediately after mixing, because the batch tends to gel or stiffen within 5 to 10 minutes after mixing. Some batches have actually gelled in the mixer.

Accordingly, it is an object of this invention to provide a novel process of casting refractory shapes from chemicaly basic refractory grain, the major portion of which is MgO, by weight, on an oxide basis.

It is another object of this invention to provide a method of slip casting thick-walled refractory shapes from chemically basic refractory materials, which method provides ample time between mixing and casting. By "thick-walled," we mean greater than ¼" thickness.

Briefly, according to one aspect of the invention, chemically basic refractory grain is size graded, slip cast, dried, and fired to obtain a ceramically bonded, high purity, basic shape. The grain is sized so that about 50 to 65% is —4+28 mesh, the remainder passing a 28 mesh screen. About 30 to 35% of the grain is —65 mesh, and the average particle diameter of the —65 mesh fraction is, preferably, on the order of 2 to 3 microns. From about 0.2 to 5% and, preferably, 0.2 to 2%, by weight, of finely divided flowers of sulfur and from about 0.1 to 1% and preferably about 0.5% ethylene-diamine, based on the weight of the dry size graded magnesite, is intimately admixed with said magnesite. The time of completion of mixing is visually determined by an operator, but experience has shown that 5 to 10 minutes is adequate in such as a muller-type mixer.

A suitable tempering fluid is prepared and mixed with the dry ingredients (the size graded basic grain, sulfur, and the ethylene-diamine for about 5 to 10 minutes, and then poured into a mold. A preferred tempering fluid is comprised of 4 to 7% of water, about 0.5% of a dispersant. Suitable dispersants are sodium pyrophosphate, Darvan #7 (a proprietary product sold by R. T. Vanderbilt Company, New York, N.Y.), etc. We prefer a plaster mold, but other types of water-absorbent materials can be used; for example, paper or cardboard. It is essential, however, that the material be water-absorbent, in order to prevent surface entrapment of gas bubbles about the cast shape. Such bubbles are undesirable, because they result in surface imperfections in the subsequent fired shape. The mold usually is subjected to vibration during pouring of the tempered mixture. Without vibration, we find it very difficult to cause the mixture to completely fill a porous mold.

The material is left in the mold to set. Set time is variable, but is easily determined by an operator. In our own work, when an exposed surface of the cast material resists light pressing of the finger without deformation, then we consider the shape to be set and proceed to strip the mold therefrom. The resulting shape should then be dried. It may be air-dried or placed in a drier which is heated to a temperature between 200 and 250° F. The drying is generally continued until the shape has constant weight. By constant weight, we mean no further volatiles are driven off as the low drying temperatures we suggest.

The dried shapes are placed in a kiln and fired to a temperature between 2500 and 3000° F., preferably between 2700 and 2900° F. for the high-purity magnesites, and magnesite chrome grain we have mentioned above.

The following examples are given by way of explanation and not by way of limitation, in order to more fully described the invention to those skilled in the art.

Example I

Example I was made according to U.S. Patent No. 3,189,668, referred to above. It was necessary to immediately transfer the tempered batch from the mixer to the plaster molds. Even so, a certain amount of stiffening occurred during the casting. However, a suitable shape was prepared.

A fused magnesite-chrome grain was size graded so that 60% was —4+28 mesh and 40% was —28 mesh. About 30% of the magnesite passed a 65 mesh screen, and had an average particle diameter (as determined by the air permeability method) on the order of 2.5 microns.

About 0.2% of finely divided flowers of sulfur was intimately admixed with the sized magnesite. The sulfur particle size is submicron. It was Technical Grade and can be purchased as an article of commerce.

We separately prepared a tempering fluid. It was comprised of 4.25 parts of water per 100 parts of the dry solids, and .5 part of Darvan #7 per 100 parts of the dry solids. The tempering fluid ingredients were intimately admixed with the dry solids consisting of the sized magnesite and sulfur. A plaster mold was prepared and the liquid and solids mixture poured into the mold until it was filled. After approximately 30 minutes, the cast material had solidified to such an extent that light finger pressure left no impression on an exposed area of the cast article. The mold was stripped easily, and the shape placed in a drier to dry overnight (about 12 hours) at about 250° F. After drying, the shape appeared strong, and careful visual examination could discern no cracking. The dried shape was placed in a kiln and fired to 2820° F. for 10 hours.

Example II

Many additions to the batch described in Example I were made in an attempt to prevent gelling and stiffening. It was finally discovered that if a small addition of ethylene-diamine was made to the batch, it could be handled without fear of rapid setting. A mix was made identical to Example I, except that 0.5 ethylene-diamine was added. The mix was tempered with about 4.5% water and thereafter a portion was poured into a plaster mold. The portion of the mix remaining was observed after a period of time and did not show the rapid loss of workability characteristic of prior mixes. After about 25 minutes, the mold was separated from the cast shape. The shape had excellent surfaces as it was released from the mold.

In the search that lead to the discovery that ethylene-diamine would prevent the rapid set of basic casting mixes several other similar compounds were fired. For example, ethylamine and diethyline-triamine were found unsatisfactory.

The combination of ethylene-diamine, sulfur, and dispersant is useful in the slip casting of other basic raw materials. For example, it may be used with any one or combination of the three magnesites listed in Table I. The water addition would have to be increased to about 6%, by weight, of the batch, but this is to be expected because of the lower density of the magnesite grain. The chemical analyses of the fused grain used in the examples is also given in the following table.

TABLE I

|  | Fused magnesite chrome grain | Dead burned magnesite, percent | Dead burned magnesite, percent | Dead burned magnesite |
| --- | --- | --- | --- | --- |
| $SiO_2$ | 1.3 | 2.8 | 0.7 | 0.32 |
| $Al_2O_3$ | 6.6 | 0.3 | 0.3 | 0.61 |
| $FeO$ | 11.7 | 0.6 | 0.3 |  |
| $Cr_2O_3$ | 17.9 |  |  |  |
| $CaO$ | 0.5 | 1.5 | 0.7 | 2.04 |
| $MgO$ | 62.1 | 94.8 | 98 | 96.83 |

It should be understood that various other refractory aggregates may be used in the coarser fraction (i.e., the +65 mesh fraction) of the dry mix that is used to make shapes according to the invention. For example, up to 15 to 20%, by weight, of chrome ore, dead burned dolomite, forsterite, alumina, olivine, silicon, carbide, hard-burned fire clay, ganister, fused silica, etc., can be used in the +65 mesh fraction. Up to 5% or so can be in the −65 mesh fraction also, if desired.

Further, if desired, a batch composition of 60% +65 mesh chrome ore and 40% −65 mesh dead burned magnesite can be cast into shapes using this invention, of course, the magnesite should be sized in the manner discussed above.

In summary, this invention is an improved method of casting basic refractory shapes from aqueous batches. It has been found that the tendency of such batches to rapidly stiffen or set up can be prevented by a small ethyline-diamine addition. It is not known to us how the addition works. However, it is believed that it tends to retard the hydration of the fine fraction of the basic refractories batch.

Having thus described the invention in detail and with sufficient particularity as to enable those skilled in the art to practice it, what is desired to have protected by Letters Patent is set forth in the following claims:

We claim:
1. That method of slip casting basic refractory shapes from basic refractory materials containing dead burned magnesite comprising the steps of:
  (1) preparing a size-graded refractory batch having a +65 mesh and a −65 mesh fraction, the average particle diameter of the −65 mesh material being on the order of about 2 to 3 microns, all percentages being by weight;
  (2) adding from 0.2 to 5%, by weight, of finely divided flowers of sulfur and about 0.1 to 1% ethylene-diamine to the size-graded basic refractory;
  (3) preparing from 4 to 7 parts, by weight, of aqueous tempering fluid;
  (4) intimately admixing the tempering fluid with the refractory, sulfur and ethylene-diamine;
  (5) casting the tempered refractory mixture in a fluid-absorbent mold and causing the tempered refractory to fill the mold;
  (6) allowing the cast material to set;
  (7) separating the mold from the set shape;
  (8) drying the cast shape to substantially constant weight; and
  (9) firing said shapes between about 2500 and 3000° F.

2. The method of claim 1 in which the refractory material is substantially all dead burned magnesite of at least about 90% MgO, by weight, on an oxide basis.

3. The method of claim 1 in which the refractory material is substantially all fused magnesite-chrome grain.

4. The method of claim 1 in which the additions are 0.5% flowers of sulfur and 0.5% ethylene-diamine.

5. The method according to claim 1 in which the size graded refractory batch has the following sizing: 50 to 65% −4+28 mesh, 35 to 50% −28 mesh, 30 to 35% −65 mesh, the average particle diameter of the −65 mesh being on the order of about 2 to 3 microns, all percentages being by weight.

References Cited

UNITED STATES PATENTS 3,189,668    6/1965    Miller.

DONALD J. ARNOLD, *Primary Examiner.*

U.S. Cl. X.R.

264—86; 106—58, 59, 62